Patented June 11, 1946

2,401,775

UNITED STATES PATENT OFFICE 2,401,775

ALPHA-SUBSTITUTED SIDE-CHAIN KETONES OF THE CYCLOPENTANOPOLYHYDROPHENANTHRENE SERIES AND PROCESS OF MAKING THE SAME

Tadeus Reichstein, Basel, Switzerland

No Drawing. Application February 5, 1943, Serial No. 474,892. In Switzerland October 5, 1942

16 Claims. (Cl. 260—397.4)

In the U. S. patent application Serial No. 195,161, a process is described for the manufacture of saturated and unsaturated derivatives of pregnane-3-ol-20-one which contain in the 21-position a diazo group, halogen or a monovalent oxygen radical and which may be further substituted in the ring system, in particular with hydroxyl, acyloxy, alkoxy or oxide groups. The process comprises converting into the corresponding acid halides, saturated or unsaturated derivatives of 3-hydroxy-etio-cholanic acid or derivatives of the same, which are further substituted in the ring system, and whose hydroxyl groups in the ring are protected by etherification or acylation; these acid halides are introduced into an excess of diazomethane solution and the 21-diazo ketones obtained subjected, if desired after preliminary alkaline saponification, to the action of aqueous inorganic acids containing oxygen or organic sulphonic acids, hydrohalic acids or organic carboxylic acids; or diazomethane is slowly added to the acid halides mentioned and the product obtained subjected, if desired, to acid saponification; in the case 21-hydroxy ketones are obtained they may be subjected after etherification to alkaline saponification, and in the case of 21-halo-ketones, the halogen atoms may be replaced by monovalent radicals containing oxygen.

In French Patent No. 840,417 an analogous process is described, starting from carboxylic acid halides which are derived from ring ketones of the cyclopentanopolyhydrophenanthrene series or their enol derivatives.

In none of these patents are there mentioned as starting products carboxylic acids of the cyclopentanopolyhydrophenanthrene series or their halides which contain in ring A in the 3-position an esterified or etherified hydroxyl group, and in ring C in the 11- and/or 12-position, keto groups, esterified or etherified hydroxyl groups or a double bond in which the carbon atom 11 participates.

It has now been found that α-substituted side chain ketones of the cyclopentanopolyhydrophenanthrene series can also be obtained by starting from carboxylic acid halides of the said series which contain, in ring A in 3-position a group convertible into hydroxyl by hydrolysis and, in ring C in 11- and/or 12-position, keto groups, groups convertible by hydrolysis into hydroxyl groups or a double bond in which the carbon atom 11 participates. These starting materials, which also may be further substituted, are caused to react with aliphatic diazo compounds; in the diazo-ketones or halo-ketones obtained the protected hydroxyl group in 3-position is set free by means of, in particular, hydrolysing agents, and converted in known manner into a keto group, if necessary with temporary protection of carbon double bonds which may be present, and subsequently, or before oxidation of the free hydroxyl group, the diazo-ketone or halo-ketone grouping is converted into a free or esterified ketol group by means of organic or inorganic acids or alkalis or carboxylic acid salts; then a double bond is introduced, if desired, in the 4,5-position in a known way and the product finally treated, if desired, with hydrolyzing and/or esterifying agents.

The starting materials may contain, in addition to those already mentioned, for example, the following substituents: substituted hydroxyl or carbinol groups, carbonyl or amino groups, halogen atoms, hydrocarbon residues etc. They may be saturated, unsaturated in one or more places and may be of any steric configuration. The following substances may, for example, be used as starting materials: halides of saturated or unsaturated, esterified or etherified, 3-hydroxy, 3,7- or 3,17-dihydroxy, 3,7,17-trihydroxy, 3-hydroxy-7-keto etiocholanic acids or the corresponding cholanic, nor-cholanic or bis-nor-cholanic acids, which contain in ring C in the 11- and/or 12-position keto groups, esterified or etherified hydroxyl groups, or a double bond in which the carbon atom 11 participates, i. e. located in the 9,11- or 11,12-position. The protected hydroxyl groups, for example, can be esterified with inorganic or organic acids such as carboxylic acids, sulphonic acids or hydrohalic acids, or etherified with alcohols such as triarylmethyl or benzyl alcohols, or with phenols or enolized or acetalized carbonyl compounds. Finally, instead of the starting products mentioned, their derivatives, e. g. enol derivatives or acetals of the compounds containing keto groups, may be used. The carboxylic acids used to start with, may be obtained for example by degredation, in stages or radically, or by conversion of bile acids, sterols, genins from cardiac glucosides etc. or synthetically starting from the corresponding ring ketones. The surprising observation was made that acid halides of 11- or 12-keto acids can be prepared without difficulty and with a much better yield than, for example, those of 3-keto acids.

Amongst the aliphatic diazo compounds used for the reaction with the acid halides may be mentioned, for example, diazomethane and monosubstituted diazomethanes, such as diazoethane, diazobutane, diazopropylene, phenyldiazomethane and diazoacetophenone, and further diazocarboxylic acid derivatives such as diazo-acetic acid-esters, -amides or -nitriles, etc.

The reaction of the carboxylic acid halides with the diazo compounds takes place, on the one hand, with elimination of hydrohalide and formation of diazoketones $$-CO-C.N_2$$
$$|$$

This is particularly the case when diazo compounds containing carbonyl groups, such as diazo fatty acid derivatives, are used and in general when an excess of diazo compound is continually present. If, however, the aliphatic diazo compounds are only added gradually to the acid halides, halo-ketones

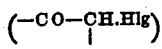

are produced which are also obtainable by subsequent action of a hydro-halide on the diazo ketones.

The application of the diazoketones or halo-ketones obtained takes place in crude condition or after their separation and purification. As next step the protected hydroxyl group in 3-position is set free. For this purpose hydrolyzing agents are generally used; reducing agents may also be used, however, e. g. if benzyl ethers are present. If there are other protected hydroxyl groups in the molecule, e. g. ester groups in ring C, these may remain unchanged on using mild hydrolyzing agents, such as bicarbonates, or may be simultaneously saponified on stronger hydrolysis e. g. with alkali hydroxides. Halo-ketones are best hydrolyzed with acidic agents.

The free 3-hydroxyl group is converted, in a manner itself known, into a keto group, e. g. with oxidizing agents such as chromic acid in glacial acetic acid or with dehydrogenating agents, e. g. heating with copper powder, action of metal alcoholates or phenolates in the presence of ketones, such as acetone or cyclohexanone. If necessary, carbon double-bonds which may be present, are temporarily protected e. g. by addition and later elimination of halogen or hydrohalide. Other free hydroxyl groups, e. g. present in ring C, may be converted at the same time as the 3-hydroxyl group into keto groups. On the other hand, with cautious dehydrogenation, e. g. using aluminium alcoholate or phenolate in the presence of ketones, a number of free nuclear hydroxyl groups may be only partly converted into keto groups, particularly this one in 3-position.

After, or even before, oxidation of the 3-hydroxyl group, the diazo-keto grouping, which may be present, is converted into a free or esterified ketol grouping by the action of anhydrous or diluted organic or inorganic acids e. g. acetic acid, propionic acid, butyric acids, crotonic acids, palmitic acid, benzoic acid, phenyl-acetic acid, sulphuric acids, methane-sulphonic acid, toluene-sulphonic acid, hydrohalic acids, phosphoric acids or boric acid. Acylates, halides or sulphonic acid esters thus can be obtained for example. If a halogen-ketone group is present instead of the diazo-ketone group, the former is converted, before or after the described oxidation, into a free or esterified ketol group by means of alkaline agents e. g. bicarbonates or of carboxylic acid salts.

If a double bond is to be introduced in the 4,5-position, this can be done in a known way, e. g. by halogenation and subsequent elimination of hydrohalide.

In a further step, ester groups which may be present can be saponified with hydrolyzing agents. The relative sensibility of the α-hydroxy ketone group to alkali should be taken into consideration, so that it is preferable to work with acids or very weak alkalis, such as bicarbonates.

Finally esterifying agents can be allowed to act. Radicals of the above mentioned acids, but also, for example, of polycarboxylic acids, such as phthalic or succinic acid, or of carbonic acid or its derivatives, thus may be introduced. If several hydroxyl groups are present, a complete or only a partial esterification, particularly in the 21-position, can be undertaken.

The most important stages of the reaction may be illustrated by the following formulas:

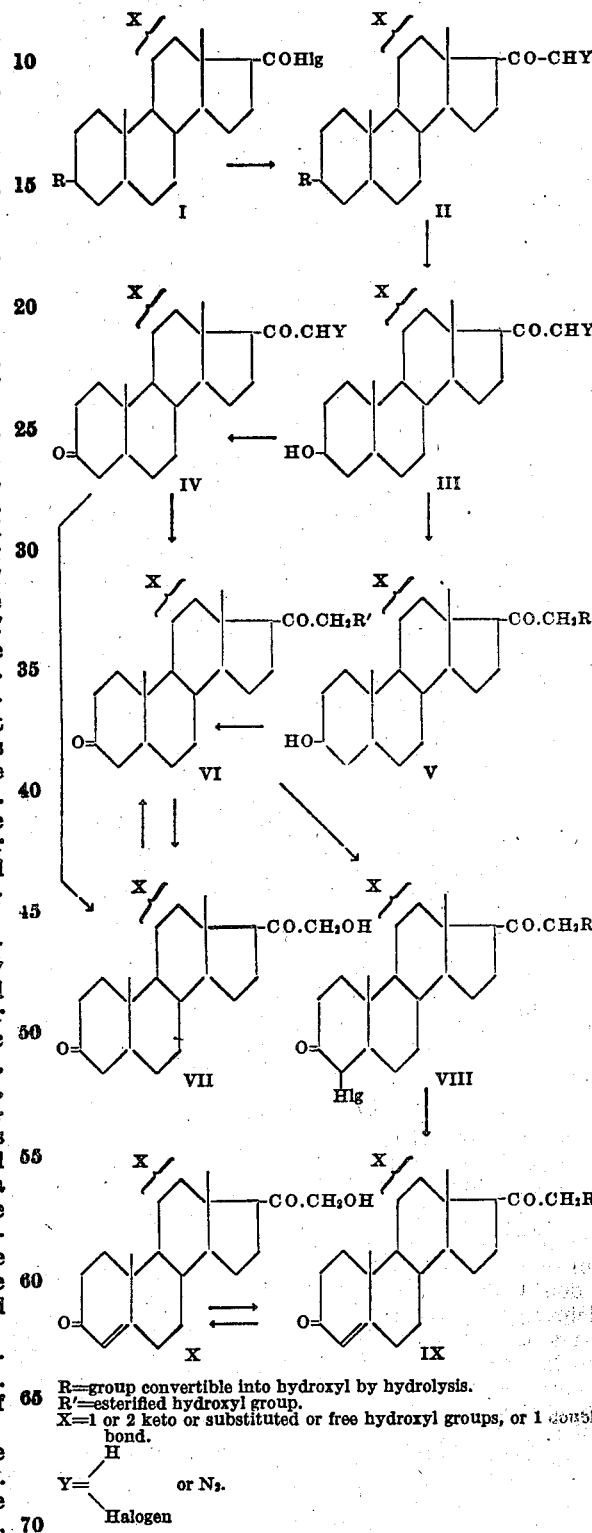

R=group convertible into hydroxyl by hydrolysis.
R'=esterified hydroxyl group.
X=1 or 2 keto or substituted or free hydroxyl groups, or 1 double bond.
Y= H \ Halogen or N₂.

The products of the present process are therapeutically extremely valuable compounds or may be converted into such. They contain, as for example corticosterone, dehydrocorticosterone, anhydrocorticosterone, keto groups or free or substituted hydroxyl groups in the 11- and/or 12-position of the cyclopentanopolyhydrophenanthrene skeleton or a double bond starting from carbon atom 11.

Example 1

5 parts of etio-desoxycholic acid diacetate, M. Pt. 202-204° C. are dissolved in 26.5 parts of pure thionyl chloride, the solution is allowed to stand for 30 minutes at 0° C., then for 20 hours at room temperature and then evaporated to dryness in vacuo with exclusion of moisture. The crystalline residue is dissolved in 30 parts of dry benzene and added at about —15° C. to a solution of diazomethane in about 250 parts of dry ether (prepared from 16 parts of nitroso-methyl carbamide and dried by repeated distillation over solid potassium hydroxide). The mixture is allowed to stand, with exclusion of moisture, first for 2 hours at 0° C., then for 22 hours at room temperature. It is then concentrated considerably on a water-bath and finally completely dried in vacuo. The golden yellow, oily residue consists of 5.87 parts of crude 21-diazo pregnane-3α,12β-diol-20-one-diacetate and is worked up directly.

For saponification of the two acetate groups, it is mixed with a solution of 3.37 parts potassium hydroxide (4.5 mol.) in 5 parts of water and 75 parts of methyl alcohol and allowed to stand for 22 hours at room temperature. A solution of about 6 parts of potassium bicarbonate in 120 parts of water is then added, the mixture freed from methyl alcohol in a vacuum and extracted with much ether. The ether solution is washed with water, dried over sodium sulphate and evaporated down. The product obtained consists of 4.39 parts of a crude 21-diazo-pregnane-3α,-12β-diol-20-one.

This preparation is heated in 25 parts of pure glacial actic acid to 100° C. After 55 minutes the calculated quantity of gas is liberated and the reaction finished. The light brown solution is evaporated to dryness in vacuo, the residue dissolved in dry benzene and separated chromatographically by running through a column of aluminium oxide. After some oily material has been eluted, a compound is obtained with mixtures of ether and chloroform which gives on crystallisation from a mixture of ether and methyl alcohol, needles with a double melting point 94-110° C. and 144-148.5° C. When recrystallized from aqueous methyl alcohol it melts at 149.5-150.5° C. and has a specific rotation of $[\alpha]_D^{18} = +139.7° \pm 4°$ (in acetone). The product is pregnane-3α,12β,21-triol-20-one-21-monoacetate. With a mixture of chloroform, ethyl acetate and methyl alcohol a further amorphous product is extracted which contains the same monoacetate.

6 parts of the above mentioned compound are dissolved in 160 parts of pure glacial acetic acid, a solution of 3 parts of chromium trioxide in 160 parts of glacial acetic acid is added and the whole allowed to stand for 16 hours at 18° C. The mixture is evaporated down in vacuo at 30° C., a little water added to the residue and the latter extracted with plenty of ether. The ether solution is washed with dilute sulphuric acid, sodium carbonate solution and water, dried over sodium sulphate and evaporated down. Crystals are obtained from a mixture of benzene and ether, precipitation of which is completed by the addition of petroleum ether. They melt at 189-191° C. and have a specific rotation of $$[\alpha]_D^{17} = +153.0° \pm 3°$$

(in acetone). The substance is pregnane-21-ol-3,12,20-trione-acetate.

Considerable quantities of the same triketone can also be obtained by oxidation of the amorphous pregnane-3α,12β,21-triol-20-one-21-monoacetate.

The same triketone is further obtainable by oxidation with chromic acid of the pregnane-12β,21-diol-3,20-dione-21-monoacetate, prepared as described in Example 2.

95 parts of pregnane-21-ol-3,12,20-trione-acetate are dissolved in 950 parts of pure glacial acetic acid and a solution of bromine in glacial acetic acid, equivalent to 1 mol. bromine, is added. After an induction period of a few minutes, the solution rapidly becomes decolourised. It is then evaporated down in vacuo at 30° C. when transparent crystals separate out which are washed with absolute ether and a mixture of ether and petroleum ether. The bromide obtained in this way melts at 182-187.5° C. The mother-liquors give, after evaporating down in vacuo, an amorphous substance which can be reduced to the initial parent product by heating with zinc dust and sodium acetate in glacial acetic acid.

The crystallized bromine compound is boiled with very pure pyridine for 5 hours under reflux. The mixture is then evaporated down in vacuo, the residue dissolved in ether, the ether solution washed with hydrochloric acid, sodium carbonate solution and water, dried and evaporated down. The residue is recrystallized from a mixture of acetone and ether and gives pale yellow prisms which are dissolved in benzene and chromatographed by running through a column of aluminium oxide.

The fractions eluted with mixtures of benzene and petroleum ether and the first ones with benzene give a product which melts indefinitely at about 160-180° C. The further fractions extracted with absolute benzene, and mixtures of benzene and ether give, on recrystallization from a mixture of acetone and ether, the Δ⁴-pregnene-21-ol-3,12,20-trione-monoacetate as colourless prisms of melting point 182-184° C. and specific rotation $[\alpha]_D^{14} = +228.6° \pm 3°$ (in acetone).

6 parts of this preparation are dissolved in 65 parts of methyl alcohol, a solution of 7 parts of potassium bicarbonate in 22 parts of water is added, and the whole allowed to stand for 23 hours at room temperature. A little water is then added and the methyl alcohol completely removed in vacuo. The material which separates out in crystalline form is filtered off with suction, washed with water and dried in vacuo. By extracting the aqueous fractions with a mixture of ether and chloroform (5:1) a small supplementary amount can be obtained. Double recrystallization from a mixture of benzene and ether gives colourless long needles which melt at 180-183° C. and have a specific rotation of $[\alpha]_D^{22} = +238.9 \pm 3°$;

$$[\alpha]_{5461}^{22} = +298° \pm 3° \text{ (in dioxane)}$$

The Δ⁴-pregnene-21-ol-3,12,20-trione obtained in this way can be converted in known manner into any other ester e. g. the propionate, butyrates, succinate, tosylate or dialkylcarbonates.

Example 2

To 2.45 parts of pregnane-3α,12β,21-triol-20-one-21-monoacetate, prepared as described in Example 1, benzene is added and the latter evaporated in vacuo at 50° C. so as to dry the preparation. The product is now boiled, excluding moisture, with 12.4 parts of aluminium-phenolate (freshly recrystallized from a mixture of benzene and petroleum ether), 500 parts of dry benzene and 170 parts of dry acetone for 20 hours under reflux on a boiling water-bath. After cooling, the mixture is evaporated down in vacuo, the residue extracted with plenty of ether, the ether solution washed with a concentrated solution of sodium potassium tartrate, with dilute hydrochloric acid, potassium bicarbonate solution and water, dried over sodium sulphate and evaporated down. The free phenol is then first removed as far as possible by heating in a high vacuum at 95° C. The crystalline residue, which still contains some phenol, is dissolved in 120 parts of dry benzene, diluted with the same quantity of petroleum ether and chromatographed by allowing to run through a column of aluminium oxide prepared with petroleum ether.

The extracts obtained with mixtures of benzene and petroleum ether, benzene, and benzene and ether give oily products or ones which do not melt sharply. The extracts obtained with benzene and ether, ether, and ether and chloroform give on evaporating down and recrystallizing from benzene, pregnane-12$\beta$,21-diol-3,20-dione-21-monoacetate as colourless crystals, M. Pt. 190–192° C., $[\alpha]_D^{14} = +146.3° \pm 3°$ (in acetone). With chloroform and a mixture of chloroform, ethyl acetate and methyl alcohol, a yellow amorphous product is eluted, which can be oxidated with chromic acid as may be the pure product, to pregnane-21-ol-3,12,20-trione-acetate (see Example 1).

4 parts of pregnane-12$\beta$,21-diol-3,20-dione-21-monoacetate are dissolved in 60 parts of pure glacial acetic acid and brominated with a normal solution of bromine in glacial acetic acid as described in Example 1. The mixture is then immediately evaporated down in vacuo at 25° C. and a little absolute ether added to the residue, when crystallization occurs. The crystals, after washing with some ether and a mixture of ether and petroleum ether melt at 171–172° C. with decomposition. The crystallized bromide is well dried and boiled under reflux with 50 parts of absolute pyridine for 5 hours. The mixture is then evaporated down in vacuo, the residue dissolved in ether, the ether solution washed until neutral, dried and evaporated down. The crude crystalline aggregate is recrystallized once from a mixture of acetone and ether, then dissolved in benzene and purified chromatographically over a column of aluminium oxide. The extracts thus obtained with benzene and ether, absolute ether, and ether and chloroform (up to 1:4) crystallize from a mixture of acetone and ether in needles which melt, after washing with ether, at 182–184° C. and show a specific rotation of $[\alpha]_D^{21} = +203.7° \pm 2°$, $[\alpha]_{5461}^{21} = +251.6° \pm 2°$ (in acetone)

The substance is $\Delta^4$-pregnene-12$\beta$,21-diol-3,20-dione-21-monoacetate. The substance shows in the ultraviolet absorption spectrum a band with a maximum at 244 m$\mu$, of which log $\epsilon = 4.12$ (in absolute alcohol).

In quite an analogous way another 21-ester, for example the propionate, butyrates, palmitate or benzoate, is obtained, when the synthesis is started with the corresponding ester.

6 parts of the said 21-monoacetate are dissolved in 60 parts of methyl alcohol, a solution of 6 parts of potassium bicarbonate in 20 parts of water is added, and the whole allowed to stand for 15 hours at room temperature. Some more water is then added and the methyl alcohol removed completely in vacuo. The precipitated oily product is dissolved in ether, the ether solution washed several times with a little water, dried and considerably concentrated down, when crystallization occurs. Double pyramids are obtained by recrystallization from a mixture of acetone and ether; they melt at 98–124° C. The specific rotation is $[\alpha]_D^{21} = 186.1° \pm 2°$;

$[\alpha]_{5461}^{21} = +221.1° \pm 2°$ (in dioxane)

The substance is presumably a hydrate of $\Delta^4$-pregnene-12$\beta$,21-diol-3,20-dione. A stereoisomeric product can be obtained by using as starting material for the synthesis the corresponding substance, isomeric in 12-position.

*Example 3*

5.8 parts of crude 21-diazo-pregnane-3$\alpha$,12$\beta$-diol-20-one-diacetate, prepared as described in Example 1 from 4.7 parts of etio-desoxycholic acid diacetate, are mixed with a solution of 2.8 parts potassium carbonate and 0.7 part potassium bicarbonate in 51 parts of water and 115 parts of methyl alcohol, in order to saponify one of the two acetate groups, and the whole allowed to stand at room temperature for 44 hours. Water is added to the mixture which then is freed from methyl alcohol in vacuo and extracted with plenty of ether, when flocculent impurities remain undissolved. The ether solution is washed with water, dried over sodium sulphate and evaporated down. The brown amorphous residue consists mainly of 21-diazo-pregnane-3$\alpha$,12$\beta$-diol-20-one-12-monoacetate.

The latter is heated to 105° C. with 22 parts of pure anhydrous glacial acetic acid. After 30 minutes approximately the calculated amount of nitrogen has been liberated and the reaction is finished. The light brown solution is evaporated down to dryness in vacuo, the residue dissolved in 100 parts of benzene, diluted with 300 parts of petroleum ether and chromatographed through a column of aluminium oxide. On elution with a mixture of benzene and ether crystals are obtained which, on recrystallization from a mixture of acetone and ether, melt at 156–158° C. and have a specific rotation of $[\alpha]_D^{19} = +150.7° \pm 2°$ (in acetone). They consist of pregnane-3$\alpha$,12$\beta$,21-triol-20-one-12,21-diacetate. From further extractions with chloroform, a small quantity of the 21-monoacetate described in Example 1 is also obtained.

2 parts of the diacetate are dissolved in 22 parts of pure glacial acetic acid, 23 parts of a 2 per cent solution of chromium trioxide in glacial acetic acid is added and the whole allowed to stand for 16 hours at 20° C. The mixture is evaporated down in vacuo almost to dryness (temperature of the bath 25° C.), water added to the residue, and the mixture extracted with plenty of ether. The ether solution is washed until neutral, dried and considerably concentrated. By the addition of petroleum-ether, 1.4 parts of long, colourless rods are obtained which, on recrystallization from a mixture of ether and petroleum-ether, melt at 120–122° C. and have a specific rotation of $[\alpha]_D^{17} = +142.4° \pm 4°$ (in chloroform). They consist of pregnane-12$\beta$,21-diol-3,20-dione-diacetate. The same product can also be obtained by the acetylation of pregnane-12$\beta$,21-diol-3,20-dione-21-monoacetate (see Example 2).

Instead of first acetolyzing and then oxydizing the 21-diazo-pregnane-3α,12β-diol-20-one-12-monoacetate, this compound may first be dehydrogenated to 21-diazo-pregnane-3,20-dione-12β-ol-acetate, for example by means of an aluminium alcoholate or phenolate in presence of acetone or cyclohexanone, and the latter then be acetolyzed to the pregnane-12β,21-diol-3,20-dione-diacetate.

2 parts of the diacetate are dissolved in 14 parts of pure glacial acetic acid and brominated with a normal solution of bromine in glacial acetic acid, as described in Example 1. The mixture is then immediately evaporated down in vacuo at 30° C. On the addition of absolute ether, the residue crystallizes and melts, after washing with ether and a mixture of ether and benzine, at 165–176° C. with decomposition. The crystalline bromide is heated to boiling with 18 parts of pure pyridine for 5 hours under reflux. The solution is then evaporated down in vacuo, the residue dissolved in ether, the ether solution washed with hydrochloric acid, sodium carbonate solution and water, dried and evaporated down. The crystalline residue is recrystallized once from acetone-ether, the crystals, which do not melt sharply, dissolved in 20 parts of benzene, the solution diluted with 80 parts of petroleum ether and chromatographed by allowing to run through a column of aluminium oxide. From the fractions eluted with absolute benzene, and benzene-ether, colourless, glossy, double pyramids, M. Pt. 158–159° C., are obtained by recrystallization from a mixture of acetone, ether and hexane. The specific rotation is $$[\alpha]_D^{17} = +197.7° \pm 5°\ (\text{in acetone})$$

The substance shows in the ultraviolet absorption spectrum a band with a maximum at 244 mμ and log ε=4.15 (in alcohol) and thus consists of Δ⁴-pregnene-12β,21-diol-3,20-dione-diacetate. The same product can be obtained by acetylation of Δ⁴-pregnene-12β,21-diol-3,20-dione (see Example 2) with acetic anhydride and absolute pyridine for 1 hour at 95° C.

7 parts of the diacetate are dissolved in 550 parts of methyl alcohol, a solution of 12 parts of potassium bicarbonate in 300 parts of water is added, and the whole allowed to stand for 17 hours at 20° C. Some water is then added, the methyl alcohol removed in vacuo and the amorphous residue dissolved in a mixture of ether and chloroform (9:1). The ether and chloroform solution is washed several times with a little water, dried over sodium sulphate and evaporated down. The residue, after recrystallization from a mixture of benzene and ether, and from acetone and ether, gives colourless octahedrons, which melt at 188–192° C. and have a specific rotation of $[\alpha]_D^{19} = +185.3° \pm 2°$;

$$[\alpha]_{5461}^{19} = +226.3° \pm 3°\ (\text{in acetone})$$

They consist of Δ⁴-pregnene-12β,21-diol-3,20-dione-12-monoacetate.

*Example 4*

The preparation of the parent material in this example can be carried out as follows:

1 part of 3,11-diketo-etio-cholanic acid methyl-ester (M. Pt. 184° C.) is hydrogenated in 20 parts of pure glacial acetic acid after the addition of 0.4 part platinum oxide until the absorption of hydrogen ceases completely, which requires about 8 hours. After filtration, the solution is evaporated down and the residue boiled under reflux for 4 hours with a solution of 2 parts of potassium hydroxide in 2 parts of water and 20 parts of methyl alcohol. After the addition of 10 parts of water, the methyl alcohol is removed in vacuo, hydrochloric acid added to the residue, cooling continually, until acid reaction to congo is reached, and the precipitated crystalline acid filtered off by suction, washed with water and dried in vacuo. The product melts indefinitely and consists of a mixture of the stereoisomeric 3α- and 3β-11-dihydroxy-etio-cholanic acids. It is partially acetylated by boiling under reflux for one hour with 5 parts of glacial acetic acid and 1 part of acetic anhydride; 2 parts of water are then added, a drop at a time, while the mixture is still hot, and boiling is continued for another 15 minutes. After the addition of more water, the mixture is considerably concentrated in vacuo and the acid completely precipitated by a further addition of water; filtered off by suction and dried in vacuo. The yellow crystalline substance has the formula $C_{22}H_{34}O_5$ and melts indefinitely, as it consists of a mixture of the sterio-isomeric 3α- and 3β-acetoxy-11-hydroxy-etio-cholanic acids. The yield is 1.1 parts. The well-dried product is dissolved in 6 parts of pure thionyl chloride and allowed to stand for 16 hours at room temperature, excluding moisture. The solution is then evaporated down in vacuum and the residue, crude Δ⁹,¹¹-3-acetoxy-etio-cholenic acid-chloride, dissolved in 10 parts of dry benzene.

The benzene solution of the parent material thus obtained is introduced at 0° C. into a dry ether solution of diazomethane prepared from 5 parts of nitrosomethyl carbamide. This mixture is first allowed to stand for 2 hours at 0° C., then for 12 hours at room temperature, is then evaporated down at a bath temperature of 50° C. and the residue dried in vacuo. The obtained 1.15 parts of crude yellow diazoketone are dissolved in 15 parts of methyl alcohol, a solution of 0.75 part potassium hydroxide in 1 part of water and 35 parts of methyl alcohol is added, and the whole allowed to stand for 8 hours at room temperature. A solution of 1.6 parts of potassium bicarbonate in 50 parts of water is then added, the methyl alcohol removed in vacuo and the product thoroughly dried by evaporating off with dry benzene. It is then allowed to stand for 20 days in a sealed ampoule with 200 parts of dry benzene, 80 parts of dry acetone and 5 parts of aluminum phenolate. It is then concentrated down considerably, the residue extracted with ether and the ether solution washed with very dilute hydrochloric acid, sodium carbonate solution and water, dried over sodium sulphate and evaporated down. The residue is very well evacuated until the free phenol has been completely removed. This crude product is heated for 30 minutes to 100° C. with 15 parts of pure anhydrous glacial acetic acid, when nitrogen escapes freely. Evaporation in vacuo gives crude Δ⁹,¹¹-21-acetoxy-pregnene-3,20-dione. It is purified chromatographically by allowing a solution of it to run through $Al_2O_3$. The diketone is removed from the column with absolute benzene and can be obtained in a pure condition by recrystallization from a mixture of ether and petroleum ether. A product which does not melt quite sharply at 160° is suitable, however, for working up. The colourless crystals have an empirical formula of $C_{23}H_{32}O_4$; they rapidly reduce alkaline silver-diammine solution at room temperature and give, when dissolved in a little chloroform, a pronounced yellow colour with tetra-nitro-methane.

Instead of dehydrogenating the 3-hydroxy-diazoketone, the latter may be acetolyzed to the 21-acetoxy-ketone and then be oxidized, for example with chromium trioxide in glacial acetic acid, the nuclear double bond being protected before the oxidation, e. g. by addition of bromine, and regenerated afterwards, for example by reacting with zinc dust or an alkali iodide.

The product is now brominated in glacial acetic acid with 2 mols bromine and then debrominated by boiling for 5 hours with absolute pyridine or by heating to 150° C. for 2 hours with dimethylaniline. The crude product is heated to 80° C. for 15 minutes with 0.5 part of zinc dust and 10 parts of glacial acetic acid, rotating continually. After filtration it is evaporated down in vacuo, extracted with ether, the solution washed with dilute hydrochloric acid, sodium carbonate solution and water, dried over sodium sulphate and evaporated down. The residue is purified chromatographically. From the fractions eluted with benzene, and with benzene and ether (99:1), colourless thin prisms are obtained, on recrystallization from ether, which melt at 158–159° C. and have a specific rotation of $[\alpha]_D^{20} = +129°$ C. (acetone). The substance has the empirical formula $C_{23}H_{30}O_4$, reduces alkaline silver-diamine solution rapidly and markedly at room temperature; dissolved in a little chloroform, it gives a pronounced yellow colour on the addition of tetranitromethane. The product, $\Delta^{4,5,9,11}$-21-acetoxy-pregnadiene-3,20-dione, is distinguished by a very high activity on adrenalectomized rats.

Starting from $\Delta^{11,12}$-3α- or $\Delta^{11,12}$-3β-acetoxy-etiochloanic acid, $\Delta^{4,5,11,12}$-21-acetoxy-pregnadiene-3,20-dione, melting at 141° C. and crystallizing from ether in fine needles, can be obtained in a similar way. It shows a specific rotation $[\alpha]_D^{15} = +98°$ (in acetone).

*Example 5*

23 parts of 3β-acetoxy-11-keto-etio-cholanic acid, M. Pt. 110–112° C. (obtainable as described in U. S. patent application Serial No. 474,726) are dissolved at 0° C. in 140 parts of very pure thionyl chloride, and allowed to stand, with exclusion of moisture, at first for 30 minutes at 0° C., and then for 16 hours at 18° C. The solution is then concentrated down in vacuo (temperature of the bath 40° C.), the residue dissolved in 500 parts of dry benzene and the solution added at 0° C. to a freshly distilled solution of diazomethane in ether which has been prepared from 100 parts of nitrosomethyl carbamide and dried over potassium hydroxide; gas is immediately liberated. The mixture is allowed to stand, at first for 2 hours at 0° C., with exclusion of moisture, and then for 16 hours at 18° C.; it is then concentrated down considerably at a bath temperature of 50° C., and finally completely dried in vacuo. The residue weighs 25 parts.

The crude 21-diazo-pregnane-3β-ol-11,20-dione-acetate is dissolved in 300 parts of methyl alcohol, a solution of 15 parts of potassium hydroxide in 20 parts of water and 700 parts of methyl alcohol added, and the whole allowed to stand for 8 hours at 20° C. A solution of 32 parts of potassium bicarbonate in 1000 parts of water is then added, the methyl alcohol removed in vacuo and the remaining suspension extracted with a large quantity of ether. The ether solution, after washing with water and drying over sodium sulphate, is concentrated at a bath temperature of 50° C. and then completely evaporated down in vacuo, 24 parts of crude 21-diazo-pregnane-3β-ol-11,20-dione remaining as a light brown resin.

The latter is then heated for 30 minutes to 95–100° C. with 300 parts of pure anhydrous glacial acetic acid and the nitrogen liberated collected over water in a measuring cylinder. When the liberation of nitrogen is complete, the solution is evaporated down in vacuo. The 24 parts of residue which remain are purified in the known way chromatographically over aluminium oxide.

The extracts obtained with mixtures of benzene and ether give, on recrystallization from ether and petroleum ether pregnane-3β,21-diol-11,20-dione-21-monoacetate in colourless platelets melting at 178–181° C. Acetylation with acetic anhydride and pyridine gives the corresponding diacetate M. Pt. 169–171° C.

8.5 parts of the monoacetate described are dissolved in 100 parts of glacial acetic acid, 100 parts of a 2% solution of chromium trioxide in glacial acetic acid (2 parts $CrO_3$) added, and the whole is allowed to stand for 16 hours at 20° C. It is then concentrated down in vacuo at a bath temperature of 30° C., water added and the whole extracted with ether. The ether solution is washed with dilute sulphuric acid, sodium carbonate solution and water, dried over sodium sulphate and concentrated. Crystallization, which soon sets in, is completed by the addition of some petroleum ether. In this way pregnane-3,11,20-trione-21-ol-acetate is obtained in colourless needles, M. Pt. 153–155° C., which show a specific rotation $[\alpha]_D^{22} = +107.2° \pm 4°$ (concentration 0.783 in acetone).

Instead of first acetolyzing and then oxidizing the 21-diazo-pregnane-3β-ol-11,20-dione, this compound may first be dehydrogenated to 21-diazo-pregnane-3,11,20-trione, for example by means of an aluminium alcoholate or phenolate in presence of acetone or cyclohexanone, and the latter then be acetolyzed to the 21-acetoxy-pregnane-3,11,20-trione.

Instead of adding the 3β-acetoxy-11-keto-etiocholanic acid-chloride to an excess of diazomethane solution, the latter solution may be added slowly to the benzene solution of the said acid-chloride. In this case the corresponding 21-chloro-20-ketone is obtained, which after saponification and oxidation of the substituent in 3-position, for example by means of alcoholic hydrochloric acid and of chromic acid, can be converted also to the pregnane-3,11,20-trione-21-ol-acetate by means, for example, of an alkali acetate in acetone or glacial acetic acid or of silver acetate.

A normal bromine solution is first prepared by mixing 10 parts of bromine with 384 parts of glacial acetic acid. 9.6 parts of the pregnane-3,11,20-trione-21-ol-acetate are dissolved in 50 parts of glacial acetic acid and 2 drops of the above solution then added. After a few minutes decolourization suddenly occurs, after which a further 48 parts of the bromine solution are added, cooling and rotating, and are almost immediately decolourized. Crystallization occurs after evaporating down in vacuo at a bath temperature of 25° C. The colourless crystals, after washing with ether, melt at 180–185° C. They consist of 4-bromo-pregnane-3,11,20-trione-21-ol-acetate.

This bromide is boiled under reflux for 5 hours with 100 parts of absolute pyridine. After evaporating down in vacuo, the residue is dissolved in a large quantity of ether, the ether solution washed with a little dilute hydrochloric acid, sodium carbonate solution and water, dried over sodium sulphate and evaporated down. The residue is purified chromatographically over a column of aluminium oxide, when the first benzene extracts give crystals which melt indefinitely at a low temperature. The further benzene, and benzene and ether fractions give, after recrystallizing twice from a mixture of acetone and ether, colourless needles melting at 175–178° C. and having a specific rotation $$[\alpha]_D^{22} = +210.7° \pm 3°$$

(concentration 0.676 in acetone). They consist of $\Delta^4$-pregnene-3,11,20-trione-21-ol-acetate (dehydro-corticosterone-acetate). A sample of very pure natural dehydro - corticosterone - acetate melts, under the same conditions, at 177–179° C., has the above specific rotation and a mixture with the synthetic product gives no melting point depression. Saponification with methyl alcoholic HCl or potassium bicarbonate in aqueous methyl alcohol gives the free dehydro-corticosterone-acetate, melting at 174–180° C.

Instead of the 3β-acetoxy-11-keto-etio-cholanic acid an ester stereoisomeric in 3-position can be used as starting product. If the process is started, however, from a 3,11-diacyloxy-etiocholanic acid (if desired with different ester groups in 3- and 11-position), corticosterone, 11-iso-corticosterone, or their 11-mono-esters or 11,21-diesters may be obtained in an analogous way, whereby the possibility exists of preparing mixed diesters. The intermediate products in the latter syntheses are for example the pregnane-20-ones, containing in 11-position a hydroxy group or a group convertible into hydroxyl by hydrolysis, in 3-position the said groups or a keto group and in 21-position a halogen or a diazo group.

What I claim is:

1. In a process for the manufacture of an α-substituted side-chain ketone of the cyclopentanopolyhydrophenanthrene series, the steps of reacting with an aliphatic diazo compound a carboxylic acid halide of the aforesaid series which contains in ring A in 3-position a group convertible into hydroxyl by hydrolysis and in ring C in at least one of the positions 11 and 12 a member of the group consisting of a keto group and a group convertible by hydrolysis into hydroxyl, and subjecting the resultant diazoketone to the action of a hydrolyzing agent whereby the group present in 3-position is converted into free hydroxyl.

2. In a process for the manufacture of an α-substituted side-chain ketone of the cyclopentanopolyhydrophenanthrene series, the step of reacting a diazoketone of the said series which contains in ring A in 3-position a member of the group consisting of a hydroxyl group and a keto group, and in ring C in at least one of the positions 11 and 12 a member of the group consisting of a keto group and a group convertible by hydrolysis into hydroxyl, with a member of the group consisting of acids, alkalis and carboxylic acid salts.

3. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and in ring C in at least one of the positions 11 and 12 a member of the group consisting of a keto group and a group convertible by hydrolysis into hydroxyl, subjecting the resultant diazoketone to the action of a hydrolyzing agent whereby the group present in 3-position is converted into free hydroxyl, and then reacting the resultant product with a member of the group consisting of oxidizing agents and dehydrogenating agents whereby the free hydroxyl in 3-position is converted into keto and then with a member of the group consisting of acids, alkalis and carboxylic acid salts whereby the diazo-keto radical is converted into a ketol radical.

4. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and in ring C in at least one of the positions 11 and 12 a member of the group consisting of a keto group and a group convertible by hydrolysis into hydroxyl, and subjecting the resultant diazoketone to the action of a hydrolyzing agent whereby the group present in 3-position is converted into free hydroxyl, and then reacting the resultant product with a member of the group consisting of acids, alkalis and carboxylic acid salts whereby the diazoketo radical is converted into a ketol radical and then with a member of the group consisting of oxidizing agents and dehydrogenating agents whereby the free hydroxyl in 3-position is converted into keto.

5. A process for the manufacture of an α-substituted side-chain ketone of the cyclopentanopolyhydrophenanthrene series, which comprises reacting with an aliphatic diazo compound a carboxylic acid halide of an unsaturated compound of the aforesaid series which contains in ring A in 3-position a group convertible into hydroxyl by hydrolysis and in ring C in at least one of the positions 11 and 12 a member of the group consisting of a keto group and a group convertible by hydrolysis into hydroxyl, subjecting the resultant diazoketone to the action of a hydrolyzing agent whereby the group present in 3-position is converted into free hydroxyl, reacting the resultant product with halogen to saturate carbon double bonds present; and reacting the resultant product with a member of the group consisting of oxidizing agents and dehydrogenating agents whereby the free hydroxyl in 3-position is converted into keto, reacting the resultant product with a halogen eliminating agent to regenerate the protected double bonds, and then with a member of the group consisting of acids, alkalis and carboxylic acid salts whereby the diazoketo radical is converted into a ketol radical.

6. A process for the manufacture of an α-substituted side-chain ketone of the cyclopentanopolyhydrophenanthrene series, which comprises reacting with an aliphatic diazo compound a carboxylic acid halide of an unsaturated compound of the aforesaid series which contains in ring A in 3-position a group convertible into hydroxyl by hydrolysis and in ring C in at least one of the positions 11 and 12 a member of the group consisting of a keto group and a group convertible by hydrolysis into hydroxyl, subjecting the resultant diazoketone to the action of a hydrolyzing agent whereby the group present in 3-position is converted into free hydroxyl, reacting the resultant product with a member of the group consisting of acids, alkalis and carboxylic acid salts whereby the diazo radical is converted into a keto radical, reacting the resultant product with halogen to saturate carbon double bonds present, reacting the resultant product with a member of the group consisting of oxidizing agents and dehydrogenating agents whereby the free hydroxyl in 3-position is converted into keto, and then with halogen eliminating agents to regenerate the protected double bonds.

7. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and no double bond in 4,5-position and in ring C in at least one of the positions 11 and 12 a member of the group consisting of a keto group and a group convertible by hydrolysis into hydroxyl, subjecting the resultant diazoketone to the action of a hydrolyzing agent whereby the group present in 3-position is converted into free hydroxyl, reacting the product with a member of the group consisting of oxidizing agents and dehydrogenating agents whereby the free hydroxyl in 3-position is converted into keto, then reacting the resultant product with a member of the group consisting of acids, alkalis and carboxylic acid salts whereby the diazoketo radical is converted into a ketol radical, and finally introducing a double bond into the 4,5-position by reaction with a halogenating agent followed by reaction with a reagent for eliminating hydrogen halide.

8. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and no double bond in 4,5-position and in ring C in at least one of the positions 11 and 12 a member of the group consisting of a keto group and a group convertible by hydrolysis into hydroxyl, subjecting the resultant diazoketone to the action of a hydrolyzing agent whereby the group present in 3-position is converted into free hydroxyl, reacting the product with a member of the group consisting of acids, alkalis and carboxylic acid salts whereby the diazoketo radical is converted into a ketol radical, then with a member of the group consisting of oxidizing agents and dehydrogenating agents whereby the free hydroxyl in 3-position is converted into keto, and finally introducing a double bond into the 4,5-position by reaction with a halogenating agent followed by reaction with a reagent for eliminating hydrogen halide.

9. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and no double bond in 4,5-position and in ring C in at least one of the positions 11 and 12 a member of the group consisting of a keto group and a group convertible by hydrolysis into hydroxyl, subjecting the resultant diazoketone to the action of a mild hydrolyzing agent whereby only the group present in 3-position is selectively converted into free hydroxyl, reacting the product with a member of the group consisting of oxidizing agents and dehydrogenating agents whereby the free hydroxyl in 3-position is converted into keto, then reacting the resultant product with a member of the group consisting of acids, alkalis and carboxylic acid salts whereby the diazoketo radical is converted into a ketol radical, and finally introducing a double bond into the 4,5-position by reaction with a halogenating agent followed by reaction with a reagent for eliminating hydrogen halide.

10. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and no double bond in 4,5-position and in ring C in at least one of the positions 11 and 12 a member of the group consisting of a keto group and a group convertible by hydrolysis into hydroxyl, subjecting the resultant diazoketone to the action of a mild hydrolyzing agent whereby only the group present in 3-position is selectively converted into free hydroxyl, reacting the product with a member of the group consisting of acids, alkalis and carboxylic acid salts whereby the diazoketo radical is converted into a ketol radical, then with a member of the group consisting of oxidizing agents and dehydrogenating agents whereby the free hydroxyl in 3-position is converted into keto, and finally introducing a double bond into the 4,5-position by reaction with a reagent for eliminating hydrogen halide.

11. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and no double bond in 4,5-position and in ring C in at least one of the positions 11 and 12 a member of the group consisting of a keto group and a group convertible by hydrolysis into hydroxyl, subjecting the resultant diazoketone to the action of a strong hydrolyzing agent whereby all groups which are convertible into hydroxyl by hydrolysis are so converted, reacting the product with a member of the group consisting of oxidizing agents and dehydrogenating agents whereby the free hydroxyl in 3-position is converted into keto, then reacting the resultant product with a member of the group consisting of acids, alkalis and carboxylic acid salts whereby the diazoketo radical is converted into a ketol radical, and finally introducing a double bond into the 4,5-position by reaction with a halogenating agent followed by reaction with a reagent for eliminating hydrogen halide.

12. A process for the manufacture of an α-substituted side-chain ketone of the cyclopentanopolyhydrophenanthrene series, which comprises reacting with an aliphatic diazo compound a carboxylic acid halide of the aforesaid series which contains in ring A in 3-position a group convertible into hydroxyl by hydrolysis and no double bond in 4,5-position and in ring C in at least one of the positions 11 and 12 a member of the group consisting of a keto group and a group convertible by hydrolysis into hydroxyl, subjecting the resultant diazoketone to the action of a strong hydrolyzing agent whereby all groups which are convertible into hydroxyl by hydrolysis are so converted, reacting the product with a member of the group consisting of acids, alkalis and carboxylic acid salts whereby the diazoketo radical is converted into a ketol radical, then with a member of the group consisting of oxidizing agents and dehydrogenating agents whereby the free hydroxyl in 3-position is converted into keto, and finally introducing a double bond into the 4,5-position by reaction with a halogenating agent followed by reaction with a reagent for eliminating hydrogen halide.

13. The compounds of the pregnane and pregnene series, containing a ketonic oxygen at the carbon atom 3 and, as sole substituent in ring C, at the carbon atom 12 a member of the group consisting of hydroxyl, a group convertible into hydroxyl by hydrolysis and a ketonic oxygen, at the carbon atom 20 a ketonic oxygen and at the carbon atom 21 a member of the group consisting of a hydroxyl and an esterified hydroxyl.

14. The saturated compounds of the pregnane series, containing a ketonic oxygen at the carbon atom 3 and, as sole substituent in ring C, at the carbon atom 12 a member of the group consisting of hydroxyl, a group convertible into hydroxyl by hydrolysis and a ketonic oxygen, at the carbon atom 20 a ketonic oxygen and at the carbon atom 21 a member of the group consisting of a hydroxyl and an esterified hydroxyl.

15. A member of the group consisting of the $\Delta^{4,5}$-pregnene-3,12,20-trione-21-ol and its esters.

16. A member of the group consisting of the $\Delta^{4,5}$-pregnene-3,20-dione-12,21-diols and their 21-mono-esters.

TADEUS REICHSTEIN.